Sept. 15, 1931.     H. G. TRAVER     1,823,010
AMUSEMENT RIDE
Filed June 18, 1930
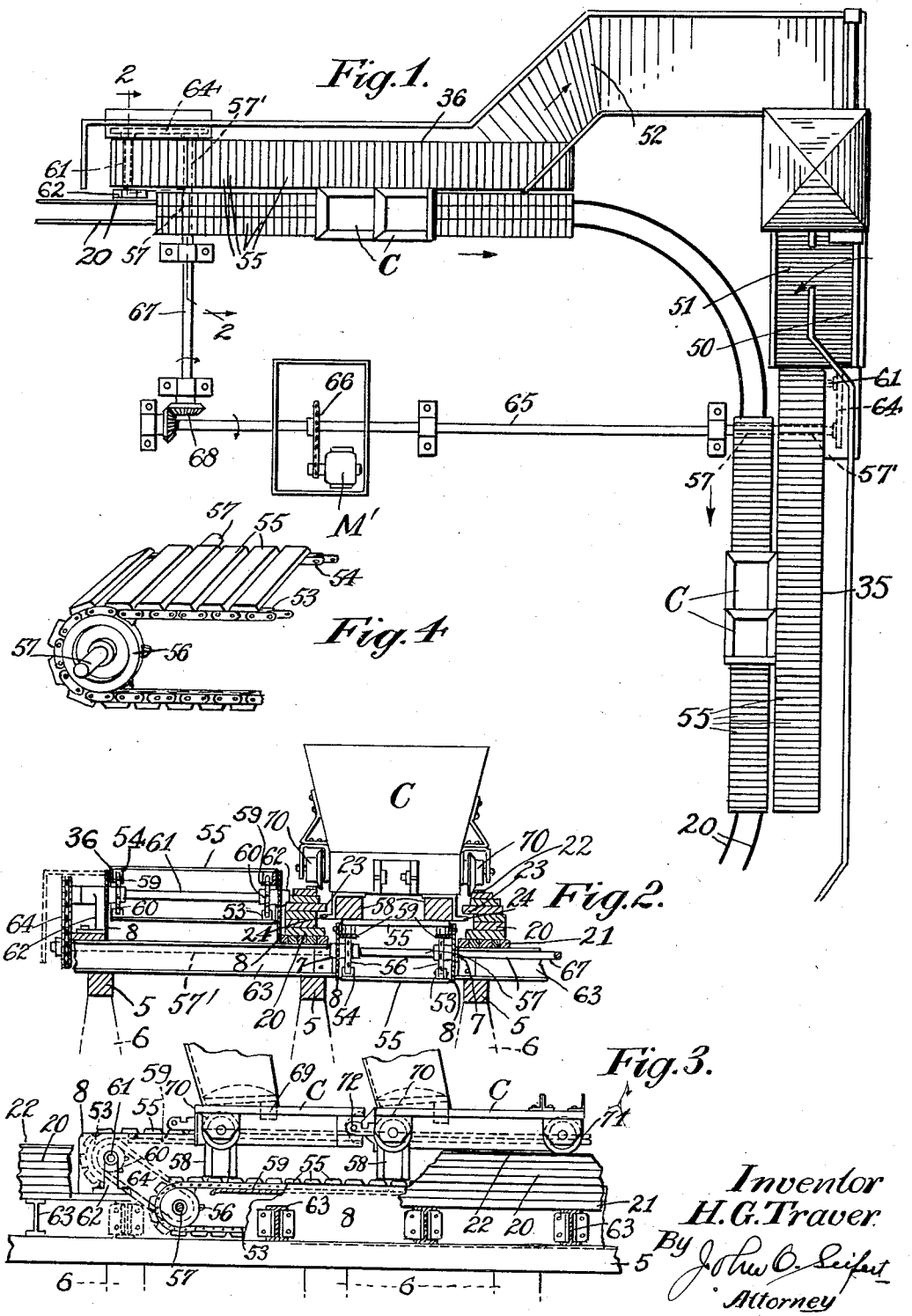
Inventor
H. G. Traver
By John C. Seifert
Attorney Patented Sept. 15, 1931

1,823,010

UNITED STATES PATENT OFFICE

HARRY G. TRAVER, OF BEAVER FALLS, PENNSYLVANIA

AMUSEMENT RIDE

Original application filed April 11, 1927, Serial No. 182,719. Now Patent No. 1,805,266, dated May 12, 1931. Divided and this application filed June 18, 1930. Serial No. 461,911.

This invention relates to railways particularly adapted for amusement rides embodying a continuous track provided at predetermined points along the same with stations for the loading and unloading of passenger carrying cars traveling on said track, the present application being for subject-matter of invention divided out from my copending application filed April 11, 1927, Serial No. 182,719, now patent No. 1,805,266, dated May 12, 1931 and relates particularly to means to facilitate the loading and unloading the cars.

It is the principal object of this invention to keep the cars in continuous motion and arrange means at the loading and unloading stations whereby passengers may enter and leave the cars while the cars are in motion, thereby eliminating the time required to stop and start the cars during the unloading and loading of the cars and thus increase the number of rides in a given length of time to the monetary benefit of the operator, said means at the different stations being actuated from a single source of power.

It is another object of the invention to provide means at a predetermined point in the ride to engage the cars and retard the motion thereof to impart the illusory effect of extending or prolonging the ride.

The embodiment of the invention comprises loading and unloading stations in the form of continuous traveling platforms or conveyors juxtaposed to and extending parallel to but in a higher plane than the track rails with similar conveyors mounted relative to but in a lower plane than the track rails and parallelly of the station platforms and adapted to move in synchronism with the station platforms, and said latter conveyors being adapted to support and convey the cars for the length of the station platforms.

In the drawings accompanying and forming a part of this application, Figure 1 is a plan view of the loading and unloading platform section of an amusement ride and showing an embodiment of the invention.

Figure 2 is a cross-sectional view on an enlarged scale taken on line 2—2 of Figure 1 looking in the direction of the arrows.

Figure 3 is a side elevation, partly broken away looking at the right of Figure 2; and Figure 4 is a perspective view of one end portion of a car conveyor either at the loading or unloading station.

In carrying out the invention there is provided a track structure of any desired formation comprising rails 20 of laminated boards supported upon ledgers 63 fixed to and supported by parallel sills 5 extended parallelly to the rails and mounted on suitable supports 6. The bottom boards of the rails are separated and supported from the ledgers 63 by a series of parallel strips 21, as shown in Figure 2, and the tread of the rails comprises a metallic strip 22 fixed to the top rail board, with an intermediate board of the laminated boards extended from the inner sides of the rails toward the opposite rail, as at 23, to form a ledge on the rails for the engagement below the same of shoes 24 carried by the cars C to prevent the cars leaving the track rails.

To load and unload the cars C stations 35 and 36 are arranged along the track at the start and end of the ride, which in the present instance extend at a right angle to each other, as shown in Figure 1. Access is had to the ride and the loading station 35 by stairs 50 and a fixed platform 51 extended as a continuation of the loading station, and exit from the ride and the unloading platform 36 is by stairs or a ramp 52.

To facilitate quick loading and unloading of the cars the stations 35, 36 are in the form of endless platforms or conveyors and comprise sprocket chains 53, 54 mounted in spaced relation by a tread portion in the form of slats 55 fixed to alternate links of the chains with the upper tread portion arranged to travel in a higher plane than the tread of the track rails, as shown in Figures 2 and 3. The chains pass around sprocket wheels 60 carried by shafts 61 mounted at each end of the loop of the conveyor in brackets 62 fixed upon the ledgers 63.

To prevent patrons accidentally falling when entering or leaving the cars due to the faster rate of speed of the cars as compared to the movement of the loading and unloading platforms, the rate of speed of the cars when passing said platforms is retarded or lowered to the same rate as that of the platforms by providing conveyors for the cars substantially of the same structure as the structure of the loading and unloading platforms and arranged in juxtaposed relation thereto between and below the track rails.

The car conveyors comprise the sprocket chains 53, 54 arranged with the slats 55, the chains passing around sprocket wheels 56 fixed to shafts 57 extending below the tracks with the sprocket wheels engaging between the track rails and the upper stretch of said conveyor positioned below the track treads for the engagement of shoes 58 fixed to the bottom of the cars and to lift the cars to clear the car wheels 70 from the track rails, as shown in Figures 2 and 3. The momentum of the cars causes them to ride partially upon the conveyors, and said conveyors traveling at a relatively slow speed will retard the movement of the cars and then transport the same. It is understood that the conveyors are of the endless type and a sprocket chain carrying shaft 57 is arranged at each end of the loop of the conveyor chains and rotatably supported in bearings 7 mounted at the ends of the ledgers 63, said ledgers being separated relative to the track rails and adjacent the loading and unloading platforms to form a passageway for the conveyors, as shown in Figure 2. The upper stretches of all the conveyors are guided and supported by angle brackets 59 fixed to side walls 8 mounted on the ledgers 63, shielding the sprocket chains 53, 54, as shown in Figures 2 and 3.

The station platform and car conveyors are actuated in synchronism. One sprocket wheel carrying shaft of each car conveyor is extended, as at 57', and said shaft extension is operatively connected with one sprocket wheel carrying shaft 61 of each station conveyor by a sprocket chain 64 passing around sprocket wheels fixed on the shaft extensions 57' and extended ends of the shafts 61, as shown in Figures 1, 2 and 3. The conveyors are driven from a suitable source of power, shown as an electric motor M', operatively connected to an extension of the sprocket wheel carrying shaft of the car conveyor having the extension 57' at the loading station, as shown at 65 in Figure 1, by a chain drive 66, and the motor operatively connected with the car and station conveyors at the unloading station by extending the shaft 57 having the extension 57', as shown as 67 in Figure 1, and providing a driving gear connection 68 between said shaft extensions 65 and 67.

In order to give the passengers of the cars the illusory effect of the extending or prolonging the rides there may be interposed at any desired point in the ride a conveyor of a structure as described arranged between the track rails to engage and support the car free from the track rails which will retard the movement of the cars and then transport the same at a slow speed.

The cars to be used in connection with the ride are of the type disclosed by my Patent #1,654,670, wherein the rear or seat carrying portion of the car body 69 is supported by traction wheels 70, while the forward end of the car has a swivel or universal connection 72 with and is supported by the wheel end of a forward car, of a series of cars connected in a train, the car at the front end thereof being provided with traction wheels 71. As such cars form no part of the present invention detailed description thereof is not deemed necessary, it being understood that any other form of passenger carrying car may be used without departing from the scope thereof.

The section of the track adjacent the loading and unloading stations is flat whereas the other sections thereof may be of any other formation such as inclined, dips and rises or spiral sections, as shown in my aforementioned co-pending application Serial No. 182,719.

Having thus described my invention, I claim:

1. In a railway, a track embodying parallel rails along which cars are propelled, and a traveling conveyor arranged between the track rails of a section of the track and movable in the direction of travel of the cars on the track and upon which conveyor the cars are adapted to ride and be transported thereby along said section of the track and transferred to the track rails at the end of said conveyor.

2. A railway as claimed in claim 1, wherein the conveyor is an endless conveyor with the upper stretch thereof traveling in a plane below the tread of the track rails.

3. A railway as claimed in claim 1, wherein the conveyor comprises a pair of endless sprocket chains mounted on and actuated by pairs of sprocket wheels, a tread carried by and extending transversely of the chains with the upper stretch below the tread of the track rails, and means connected to the sprocket wheels and adapted to actuate the conveyor.

4. A railway as claimed in claim 1, wherein the conveyor comprises a pair of opposed endless sprocket chains suspended and actuated by sprocket wheels, means to guide and support the upper stretches of the chains below the tread of the track rails, a tread carried by and extending transversely of the chains, and power means connected to the sprocket wheels to actuate the conveyor.

5. In an amusement ride, a continuous track embodying parallel rails, a platform arranged alongside a section of the track, and a traveling conveyor at said section of the track and platform arranged between the track rails onto which conveyor cars traveling along the track are adapted to ride and be transported thereby for the length of the platform and again transferred to the track rails at the end of the platform and conveyor.

6. An amusement ride as claimed in claim 5, wherein the conveyor is an endless conveyor and the platform is movable longitudinally of the track in the direction of the movement of the conveyor, and means to actuate the platform and conveyor in synchronism.

7. An amusement ride as claimed in claim 5, wherein the conveyor is an endless conveyor arranged within and the upper stretch thereof in a plane below the track rails.

8. An amusement ride as claimed in claim 5, wherein the platform comprises an endless conveyor with the upper stretch thereof traveling in a plane above the track rails.

9. In an amusement ride, a continuous track embodying parallel rails, and loading and unloading platforms arranged in angular relation to each other alongside sections of the track and comprising endless conveyors with the upper stretches thereof traveling in a plane above the track rails.

10. In an amusement ride, a continuous track embodying parallel rails, loading and unloading platforms arranged in angular relation to each other alongside sections of the track and comprising endless conveyors with the upper stretches thereof traveling in a plane above the track rails, and endless conveyors mounted between the track rails at the loading and unloading platforms and adapted to engage and support cars traveling along the track from the track rails and transport the same for the length of the platforms in synchronism with the movement of the loading and unloading platforms.

11. In an amusement ride, a continuous track embodying parallel rails to tractionally support cars, a platform arranged alongside a section of the track, a traveling conveyor at said track section arranged between, and the upper stretch traveling in a plane below, the track rails, and means fixed to the bottom of the cars to engage the upper conveyor stretch during the travel of the cars along the track adjacent the platform whereby the cars are lifted from the track rails and transported by the conveyor for the length of the platform.

12. In an amusement ride, the combination of a track and cars to travel on the track, and a conveyor arranged in parallel relation to a section of the track and continuously traveling in the direction of travel of the cars on the track and upon which conveyor the cars are adapted to ride and be transported thereby and again delivered onto the tracks at the end of the conveyor travel.

13. In an amusement ride, the combination of a continuous track and cars to travel along the track, a station, a pair of traveling platforms arranged in parallel relation to the track, one comprising a loading platform having access thereto from the station and traveling in a direction away from the station, and the other an unloading platform traveling in a direction toward the station and having access therefrom to the station.

14. In an amusement ride as claimed in claim 13, traveling conveyors arranged in parallel relation to the track and juxtaposed to the traveling loading and unloading platforms and upon which conveyors the cars are adapted to ride and be transported relative to the platforms, and means to operate the platforms and conveyors in synchronism.

Signed at Beaver Falls, in the county of Beaver and State of Pennsylvania, this 29th day of May, 1930.

HARRY G. TRAVER.